Patented July 23, 1940

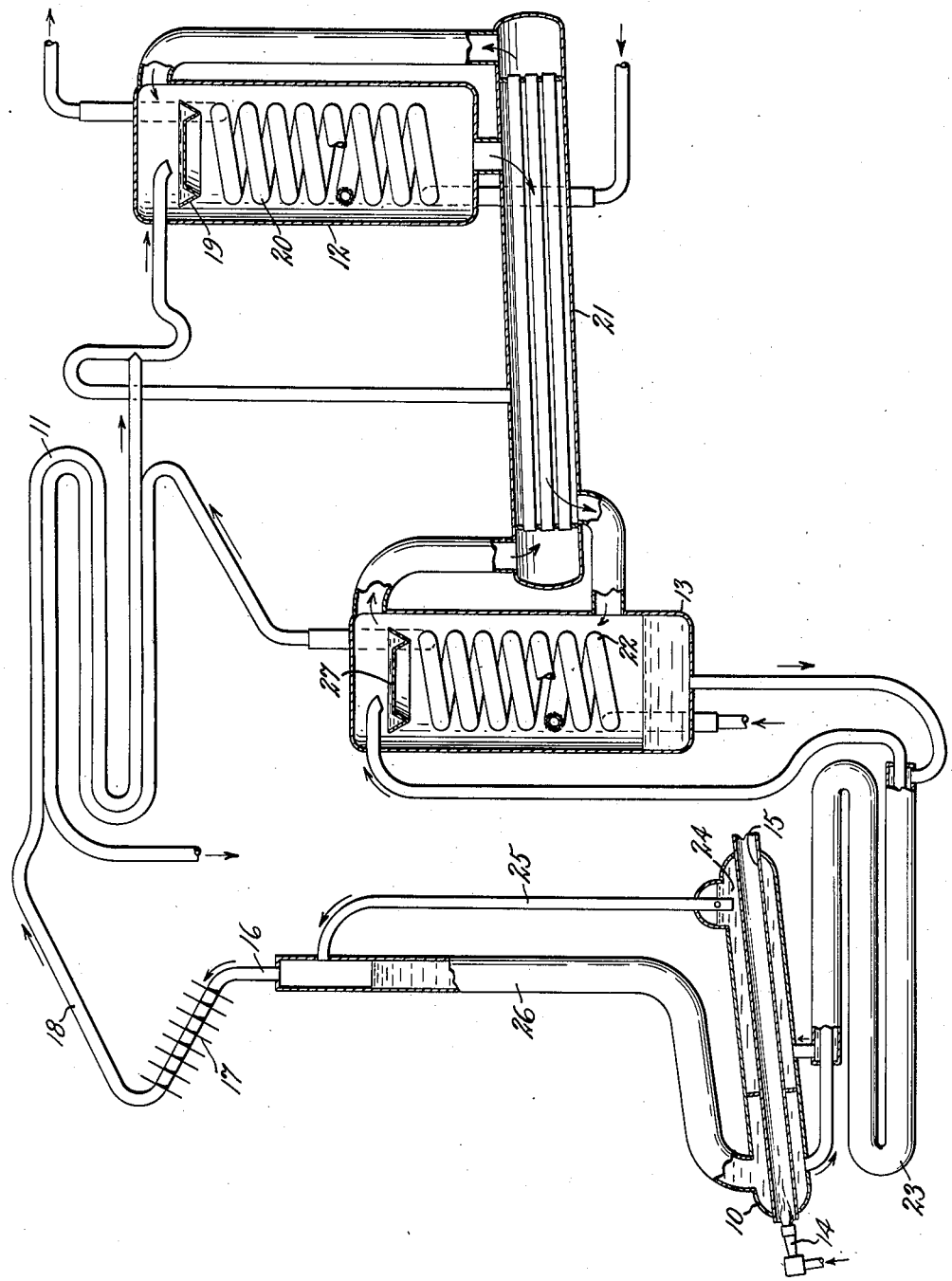

2,208,798

UNITED STATES PATENT OFFICE 2,208,798

REFRIGERATION

Walter A. Kuenzli, Evansville, Ind., assignor to Servel, Inc., New York, N. Y., a corporation of Delaware Application December 10, 1936, Serial No. 115,142

7 Claims. (Cl. 62—119.5)

My invention relates to refrigeration and it is an object of the invention to provide improved liquid conducting surface in gas and liquid contact parts of refrigeration apparatus as will appear from the following description and accompanying drawing of which the single figure shows more or less diagrammatically a refrigeration system of a type making use of evaporation of refrigerant fluid in the presence of an inert gas and embodying the invention.

The system shown is generally like that described in U. S. Patent No. 1,609,334 to von Platen and Munters. The system is made up of a number of steel vessels and pipes welded together to form an hermetically sealed system. All the spaces of the system are in open and unrestricted communication so that all parts are at the same total pressure. The system contains hydrogen and a water solution of ammonia. Other suitable alternative fluids may be used.

The parts of the system include a generator 10, an ammonia condenser 11, an evaporator 12, and an absorber 13. The generator 10 is heated, for instance, by a gas burner 14 arranged so that the flame is projected into the lower end of the generator heating flue 15. Ammonia vapor expelled from solution by heat in the generator 10 flows through a conduit 16, an air-cooled rectifier 17, and a conduit 18 into the ammonia condenser 11. The ammonia vapor is condensed to liquid in the condenser 11. The liquid ammonia flows from the condenser 11 into the upper part of the evaporator 12. In the upper part of the evaporator 12, the liquid ammonia flows into a trough 19 from which it overflows and drips from the bottom of the trough onto the upper turn of an evaporator coil 20. The liquid ammonia flows downward along the coil turns and drops from one turn to the other, wetting the outer surface of the coil. The liquid ammonia on the coil 20 evaporates and diffuses into hydrogen, producing a refrigerating effect which cools brine or other liquid to be cooled flowing in the coil 20.

Hydrogen circulates through and between the evaporator 11 and the absorber 13 by way of a gas heat exchanger 21. In the absorber 13, ammonia vapor is absorbed out of the rich gas by weakened absorption solution. The absorber is cooled by a suitable cooling fluid such as water flowing in an absorber coil 22. The gas circulation between the evaporator 11 and the absorber 13 occurs as a result of the difference in weights of the columns of rich and weak gas, the column of gas flowing from the evaporator to the absorber containing the greater amount of the heavier ammonia vapor and being heavier than the column of weak gas flowing from the absorber to the evaporator.

The absorption solution is circulated through and between the generator 10 and the absorber 13 by way of a liquid heat exchanger 23, and circulation of the solution is caused by the lifting action of vapor formed in chamber 24 of the generator which raises liquid through a riser 25 into the generator standpipe 26 where the liquid level is such that solution may overflow therefrom into the absorber. Liquid entering the absorber 13 flows into an annular trough 27 from which it overflows and drips from the bottom of the trough onto the upper turn of the absorber coil. The liquid flows downwardly along the coil and drips from one turn to the next, wetting the outer surface of the coil to present a large surface for absorption of ammonia out of the gas.

I have found that rapid and uniform wetting of the outer surfaces of the absorber and evaporator coils by the descending absorption solution and liquid ammonia, respectively, may be accomplished by roughening the outer surfaces of these coils as, for instance, by depositing thereon a porous layer of suitable metal such as iron. A layer of iron deposited on these coils by electroplating is porous and exerts considerable capillary effect on the liquid, causing it to spread out over the surface of the coil. The porosity and roughness of the iron deposited by electro-plating is influenced by composition, concentration, hydrogen ion content, temperature of the solution employed, and the current density. I control these factors to obtain the greatest amount of porosity as opposed to the usual attempt to obtain a smooth coating in normal plating operations.

It will be understood by those skilled in the art that my invention is not limited to the embodiment shown in the drawing and described in the specification but only as indicated in the following claims.

What is claimed is:

1. In refrigeration apparatus having a generator, condenser, evaporator vessel and absorber vessel interconnected to form a system in which inert gas circulates in a path between the evaporator vessel and absorber vessel and in which liquid refrigerant is introduced into the evaporator vessel for downward flow therein and in which absorption liquid is introduced in the absorber vessel for downward flow therein; a sloping member in one or more of said vessels in the path of flow of inert gas and upon which downward flowing liquid is caused to flow and having a surface coherent to and of greater porosity than the material beneath said surface to facilitate spreading of liquid on said surface in the presence of the inert gas.

2. Apparatus as set forth in claim 1 in which said sloping member comprises a conduit connected for flow of liquid interiorly therethrough and having sloping portions formed so that liquid introduced in said vessel drips from part to part of said conduit on the exterior thereof, and in which said surface coherent to and of greater porosity than the material beneath said surface is on the exterior of said conduit.

3. Apparatus as set forth in claim 1 in which said surface coherent to and of greater porosity than the material beneath said surface is deposited by electro-plating.

4. Apparatus as set forth in claim 1 in which said surface coherent to and of greater porosity than the material beneath said surface is produced by electrolytic action.

5. Refrigerating apparatus of the kind in which refrigerant diffuses into inert gas and having structure providing a passage connected for flow of inert gas therethrough, said structure including a sloping member and having an inlet and outlet at different elevations, and means for introducing liquid in said structure for downward flow on said sloping member, characterized by said sloping member having a surface coherent to and of greater porosity than the material beneath said surface to facilitate spreading of liquid on said surface in the presence of the inert gas.

6. Apparatus as set forth in claim 5 in which said surface coherent to and of greater porosity than the material beneath said surface is produced by electrolytic action.

7. Refrigerating apparatus of the kind in which refrigerant diffuses into inert gas and having structure providing a passage connected for flow of inert gas therethrough, said structure including a conduit having sloping portions and having an inlet and outlet at different elevations, and means for introducing liquid in said structure for downward flow along said conduit, characterized by said sloping portions having a surface coherent to and of greater porosity than the material beneath said surface to facilitate spreading of liquid on said surface in the presence of the inert gas.

WALTER A. KUENZLI.